(12) United States Patent
Sapper

(10) Patent No.: US 6,337,139 B1
(45) Date of Patent: Jan. 8, 2002

(54) METHOD FOR PRODUCING MULTILAYER COATINGS

(75) Inventor: Ekkehard Sapper, Rimpar (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/463,079

(22) PCT Filed: Jul. 16, 1998

(86) PCT No.: PCT/EP98/04439

§ 371 Date: Jan. 17, 2000

§ 102(e) Date: Jan. 17, 2000

(87) PCT Pub. No.: WO99/03595

PCT Pub. Date: Jan. 28, 1999

(30) Foreign Application Priority Data

Jul. 18, 1997 (DE) .......................................... 197 30 890

(51) Int. Cl.⁷ .............................................. B32B 22/92
(52) U.S. Cl. ...................... 428/524; 428/480; 428/500; 428/502; 428/522; 428/532; 427/407.1; 427/409
(58) Field of Search .......................... 428/411.1, 423.1, 428/480, 532, 533, 502, 529, 522, 500; 427/407.1, 409

(56) References Cited

U.S. PATENT DOCUMENTS

| | | | |
|---|---|---|---|
| 4,268,542 A | | 5/1981 | Sakakibara et al. ......... 427/195 |
| 5,100,735 A | * | 3/1992 | Chang ........................ 428/515 |
| 5,342,882 A | * | 8/1994 | Gobel et al. ................. 524/832 |
| 5,556,527 A | * | 9/1996 | Igarashi et al. ............. 204/488 |
| 5,840,372 A | * | 11/1998 | Rink et al. ............... 427/407.1 |
| 5,855,964 A | * | 1/1999 | Rademacher et al. ........ 427/475 |
| 6,063,954 A | * | 5/2000 | Diener et al. ................. 560/26 |

FOREIGN PATENT DOCUMENTS

| | | |
|---|---|---|
| EP | 0 038 127 | 10/1981 |
| WO | WO93/23443 | * 11/1993 |
| WO | WO94/09915 | * 5/1994 |
| WO | WO97/16242 | * 5/1997 |

OTHER PUBLICATIONS

Japanese Patent Abstract, Japanese Appl. No. 0826995, Filing Date: Mar. 31, 1995 (1 page).

* cited by examiner

Primary Examiner—Blaine Copenheaver
Assistant Examiner—Christopher Paulraj

(57) ABSTRACT

The invention relates to a process for applying a multicoat finish to a substrate surface, comprising the following steps:

(1): applying an aqueous basecoat A to the substrate surface, (2): forming a polymer film from the aqueous basecoat A applied in stage (1), (3): applying an aqueous transparent topcoat B to the basecoat film obtained in stage (2), and finally (4); baking the basecoat film and the topcoat film together, wherein the basecoat A comprises at least one hydroxyl-containing binder in aqueous solution or dispersion and a stable aqueous dispersion, prepared with a hydroxyl-containing emulsifier, of a hydrophobicized amino resin, and to substrates coated in accordance with the process of the invention.

18 Claims, No Drawings

METHOD FOR PRODUCING MULTILAYER COATINGS

FIELD OF THE INVENTION

The invention relates to a process for producing a multicoat finish on a substrate surface by successive application of an aqueous basecoat and of an aqueous topcoat and the subsequent simultaneous baking of the basecoat film and of the topcoat film, said aqueous basecoat comprising hydrophobicized amino resins emulsified with hydroxyl-containing emulsifiers.

BACKGROUND AND SUMMARY OF THE INVENTION

In automotive finishing in particular, though also in other sectors where there is a desire for coatings having a good decorative effect and at the same time affording good protection against corrosion, it is known to provide substrates with two or more coating films arranged atop one another.

Multicoat paint systems are preferably applied in accordance with the so-called basecoat/clearcoat process; that is, a pigmented basecoat is applied first and following a short flash-off time without a baking step (wet-on-wet technique) is coated over with a clearcoat. Subsequently, basecoat and clearcoat are baked together. The basecoat/clearcoat process has acquired particular importance in connection with the application of automotive topcoats, especially in the case of metallic paints.

Economic and environmental considerations have resulted in attempts to use aqueous basecoats for the production of multicoat finishes.

The coating compositions for producing these basecoat films must be able to be processed by the nowadays customary, rational wet-on-wet technique; that is, following a short initial drying period without a baking step, they must be overcoated with a transparent topcoat film without exhibiting disruptive etching and "strike-in" phenomena.

DE-A-40 28 386 describes a process for producing a multicoat finish on a substrate surface, in which (1) as the basecoat, a water-thinnable basecoat is applied which comprises water, organic solvents if desired, a water-dilutable binder, pigment particles, and a polyamide as rheological assistant, (2) a polymer film is formed on the surface from the composition applied in stage (1), (3) a suitable transparent topcoat is applied to the resulting basecoat film, and subsequently (4) the basecoat film is baked together with the topcoat film. As the topcoat it is possible to use conventional solventborne clearcoats, water-thinnable clearcoats, or transparent powder coating materials.

DE-A-42 16 613 embraces a process for producing a two-coat paint system on a substrate surface, in which (1) a pigmented aqueous basecoat comprising as its binder a water-dilutable (meth)acrylate emulsion polymer prepared in the presence of specific emulsifiers is applied to the substrate surface, (2) a polymer film is formed from the basecoat applied in stage (1), (3) a transparent topcoat is applied to the resulting film, and subsequently basecoat film and topcoat film are baked together. As the topcoats, it is again possible to use conventional solventborne clearcoats, aqueous clearcoats, or transparent powder coating materials.

In the case where aqueous basecoats, in accordance, for example, with DE-A-40 28 386 or DE-A-42 16 613, are used simultaneously with aqueous topcoats in the basecoat/clearcoat process (wet-on-wet technique) great problems occur, especially when using aqueous slurries of transparent powder coating material as the topcoat, since the aqueous basecoat films, which have undergone only initial drying for a short period, when coated with the aqueous topcoat withdraw water from it and are themselves in turn partially dissolved. As a consequence of the partial dissolution of the aqueous basecoat film and of the attendant film softening, and as a consequence of the withdrawal of water from the drying aqueous topcoat, the initial drying and baking of the basecoat/topcoat system are accompanied by cracks over the entire surface—a phenomenon also known as "mud cracking". A further severe problem is the tendency of aqueous basecoats toward popping in the course of baking.

DE-A-42 22 194 describes a process for producing two-coat paint systems on a substrate surface, in which (1) a pigmented, solvent- or waterborne basecoat is applied to the substrate surface, (2) a polymer film is formed from the paint applied in stage (1), (3) a transparent powder topcoat is applied to the resulting basecoat film, said topcoat comprising an epoxy-functional polyacrylate resin as its binder, and subsequently (4) the basecoat film is baked together with the transparent powder coating film.

A fundamental problem of DE-A-42 22 194 is the need for different application methods for the basecoat, which is generally applied by spraying or dipping, and for the transparent powder coating material, which is generally applied by means of electrostatic techniques. Furthermore, DE-A-42 22 194 allows solventborne basecoats, which again is objectionable from the environmental standpoint.

The object of the present invention, therefore, was to provide suitable basecoat compositions with which processes for multicoat finishing in accordance with the so-called basecoat/clearcoat process using the wet-on-wet technique, in which both basecoat and topcoat are aqueous systems and can be applied to the substrate using the same application method, can be conducted in such a way that the partial dissolution of the aqueous basecoat film and the attendant film softening by the aqueous topcoat play a minor part, that no cracks appear in the basecoat/topcoat system (mud cracking) in the course of initial drying and/or in the course of baking, and, in particular, that the tendency toward popping in the basecoat film during the baking step is reduced.

The invention accordingly provides a process for producing a multicoat protective and/or decorative finish on a substrate surface, comprising the following steps:

(1): applying an aqueous basecoat A, comprising a hydrophobicized amino resin as crosslinker, said amino resin being stably emulsified in the aqueous phase by means of a hydroxyl-containing emulsifier, and comprising at least one hydroxyl-containing binder present in aqueous solution or in aqueous emulsion, to the substrate surface, (2): forming a polymer film from the aqueous basecoat A applied in stage (1), (3): applying an aqueous transparent topcoat B to the resulting basecoat film, and finally (4): baking the basecoat film and the topcoat film together.

In one preferred embodiment of the invention the hydroxyl-containing emulsifier for the hydrophobic amino resin, which is preferably a melamine-formaldehyde condensate etherified with C3 to C12 alcohols, is an oligomeric and/or polymeric diol and/or polyol having an emulsifying action, with particular preference a diol and/or polyol from the group consisting of polyacrylate diols and/or -polyols, polyesterdiols and/or -polyols and polyetherdiols and/or -polyols, and, with very particular preference, from the group consisting of polyurethanediols and/or -polyols and polycarbonatediols and/or -polyols.

The hydroxyl-containing binder in the basecoat A is preferably selected from the group consisting of polyacrylates, polyurethanes, polyesters, polyethers, alkyd resins and cellulose derivatives.

In a further preferred embodiment of the invention the aqueous topcoat B is an aqueous one-component and/or two-component clearcoat or, with particular preference, a powder slurry clearcoat.

DETAILED DESCRIPTION OF THE INVENTION

The Basecoat A

In accordance with the invention, the basecoat A comprises, as the crosslinking agents, hydrophobicized amino resins emulsified stably in the aqueous phase by means of hydroxyl-containing emulsifiers.

The hydrophobic amino resins, which are known per se, are preferably condensates of aldehydes, especially formaldehyde, and, for example, urea, guanamine, benzoguanamine, and preferably melamine.

The hydrophobic amino resins contain alcohol groups, preferably methylol groups, which are etherified preferably with C3 to C12 alcohols, examples being isopropanol, n-butanol, isobutanol, tert-butanol, amyl alcohol, 1-hexanol, 1-octanol, 2-ethylhexanol, 1-decanol, isodecanol, 1-dodecanol and isododecanol.

Butanol-etherified melamine-formaldehyde resins are used in particular as the hydrophobic amino resins.

As the hydroxyl-containing emulsifiers for the hydrophobic amino resins it is preferred to use diols and/or polyols having emulsifying properties, with particular preference diols and/or polyols having a molecular weight of between 500 and 50,000 daltons, and, with very particular preference, having a molecular weight of between 500 arid 5000 daltons.

The emulsifying diols and/or polyols are preferably selected from the group consisting of polyacrylatediols and/or -polyols, polyesterdiols and/or -polyols and polyetherdiols and/or -polyols, and, with very particular preference, from the group consisting of polyurethanediols and/or -polyols and polycarbonatediols and/or -polyols.

The ratio of hydrophilic to hydrophobic moieties in the diols and/or polyols is established preferably either by way of the molecular weight of the diols and/or polyols and the proportion of hydrophilic groups already present in the diol and/or polyol, or by way of the introduction of additional hydrophilic groups, such as, for example, acid groups or salts thereof, e.g., carboxyl or carboxylate groups, sulfonic acid or sulfonate groups, and phosphonic acid or phosphonate groups.

Further crosslinking agents which may be present in the basecoat A are any crosslinking agents suitable for the crosslinking of hydroxyl-containing binders.

Preferred further crosslinking agents are blocked and/or nonblocked polyisocyanates whose isocyanate groups are attached preferably to aliphatic or cycloaliphatic radicals. Examples of such polyisocyanates are hexamethylene diisocyanate, isophorone diisocyanate, trimethylhexamethylene diisocyanate, dicyclohexylmethane diisocyanate, 1,3-bis(2-isocyanatoprop-2-yl)benzene, and also adducts of these polyisocyanates with polyols, especially low molecular mass polyols, such as trimethylolpropane, for example, and also polyisocyanates which are derived from the aforementioned polyisocyanates and contain isocyanurate and/or biuret groups, and which preferably contain more than two isocyanate groups in the molecule.

For the blocking of the polyisocyanates it is possible to use any blocking agent which is known per se to the skilled worker and has a sufficiently low deblocking temperature.

Hydroxyl-containing binders used in the basecoats A are preferably aqueous dispersions of preferably hydroxyl-containing polyacrylates, polyurethanes, polyesters, polyethers, alkyd resins and/or cellulose derivatives. Suitable aqueous binders based on hydroxyl-containing polyacrylates are described, for example, in DE-A-38 32 826, which discloses a two-stage preparation process for water-dilutable polyacrylates that are suitable for use in basecoats.

Hydroxyl-containing polyurethanes for aqueous basecoats A are disclosed, for example, in DE-A-38 25 278, in which the polyurethanes from a mixture of polyetherdiols and polyesterdiols, diisocyanates and compounds having at least two isocyanate-reactive groups and one group capable of forming anions are reacted to give an intermediate which is subsequently reacted with polyols containing at least three hydroxyl groups.

Hydroxyl-containing polyesters and/or polyethers suitable as binders for aqueous basecoats A, and also capable of being employed as prepolymers in the synthesis of the hydroxyl-containing polyurethanes, are likewise described in the prior art.

The use of alkyd resins and cellulose derivatives as binder components in aqueous basecoats is disclosed, for example, in DE-A-39 22 363.

Preferred binders are acrylated polyurethane resins, obtainable, for example, in accordance with DE-A-43 39 870, by subjecting an ethylenically unsaturated monomer or a mixture of ethylenically unsaturated monomers to free-radical polymerization in an aqueous dispersion of a polyurethane resin, the weight ratio between the polyurethane resin and the ethylenically unsaturated monomer being between 1:10 and 10:1.

In addition to the hydroxyl-containing binders described above, the basecoats A used in accordance with the invention may also include, in proportions of up to 75% by weight, based on the binder, further binder components having low hydroxyl contents or being free from hydroxyl groups, such as, for example, water-dilutable polyester resins, water-dilutable polyacrylate resins, water-dilutable polyurethane resins, water-dilutable alkyd resins, water-dilutable cellulose derivatives, and water-dilutable polyether resins.

As pigments, the basecoats A include, if desired, any organic or inorganic pigments suitable for aqueous coating materials, or mixtures of such pigments, in proportions of up to 30% by weight, preferably between 5 and 25% by weight, based on the solids content of the basecoat. Examples that may be mentioned of pigments which can be used are titanium dioxide, iron oxide, carbon black, metal pigments, especially aluminum pigments, and pearl luster or interference pigments.

The basecoats A preferably comprise metal pigments, especially aluminum pigments, alone or in combination with nonmetallic pigments.

It is also possible for anticorrosion pigments to be present, such as zinc phosphate, for example.

In addition, the basecoat A may also include fillers known per se and customary for coating materials, examples being silica, magnesium silicate, titanium dioxide, and barium sulfate.

Furthermore, the basecoats A of the invention may include crosslinked polymeric microparticles (compare, for example, EP-A-0 038 127) and/or customary organic or inorganic rheology-controlling additives. Examples of compounds which act as thickeners are sheet silicates or watersoluble cellulose ethers and also synthetic polymers having ionic or associative groups, such as polyvinyl alcohol, polyamides, poly(meth)acrylamide, poly(meth)acrylic acid, polyvinyl-pyrrolidone, or hydrophobically modified ethoxylated urethanes or polyacrylates.

The basecoats A may also contain organic solvents in amounts of up to 15% by weight. Examples of suitable organic solvents are naphthalenes, mineral spirits or alcohols, preferably low molecular mass diols, such as alkylene glycols or dimethylolcyclohexane, for example.

Further components which may be present in the basecoats A comprise film-forming auxiliaries, such as, for example, dicarboxylic acid dialkyl esters or high-boiling mineral spirits or naphthalenes, having a boiling point of more than 100 degrees C, preferably more than 140 degrees C.

The basecoats A of the invention may additionally comprise further auxiliaries and/or additives, such as, for example, catalysts for the crosslinking reaction, defoamers, dispersing auxiliaries, wetting agents, preferably carboxy-functional dispersants differing from the abovementioned emulsifiers, antioxidants, UV absorbers, free-radical scavengers, leveling assistants, and/or biocides.

The Topcoat B and the Process of the Invention

Topcoats B which can be used are all aqueous topcoats suitable for the production of two-coat paint systems. The topcoats B are preferably aqueous clearcoats or aqueous coating materials comprising transparent pigments. The aqueous clearcoats B can be one-component or two-component clearcoats, particular preference being given to powder slurry clearcoats.

Exemplary of suitable topcoats B are aqueous topcoats in accordance with DE-A-38 32 826, having hydroxyl-containing water-dilutable polyacrylate resins as binders and conventional amino resins as crosslinking agents (two-component clearcoat).

The powder slurry clearcoats which are particularly preferred as topcoats B consist preferably of a powderous component comprising at least one binder, preferably a crosslinking agent and, if desired, catalysts for the crosslinking reaction, and also auxiliaries and additives typical of powder coatings, such as, for example, devolatilizing agents, leveling agents, UV absorbers, free-radical scavengers or antioxidants, and of an aqueous dispersion as mixer component, comprising a thickener alone or together with dispersants, small amounts of solvent, biocides and further auxiliaries, such as wetting agents, defoamers, and also additional leveling agents, UV absorbers, free-radical scavengers or antioxidants, for example.

Powder slurry clearcoats of this kind are described, for example, in U.S. Pat. No. 4,268,542.

The process for applying multicoat finishes using the basecoats of the invention is subdivided into the following stages:

(1): applying an aqueous basecoat A to the substrate surface, (2): forming a polymer film from the aqueous basecoat A applied in stage (1), (3): applying an aqueous transparent topcoat B to the basecoat film obtained in stage (2), and finally (4): baking the basecoat film and the topcoat film together.

In order to form the polymer film in accordance with stage (2), the basecoat film applied in stage (1) is left to evaporate, preferably at elevated temperature, before the application of the transparent topcoat B in stage (3), the evaporation time depending on the temperature and being adjustable over wide ranges. For example, at temperatures of from 60 to 100 degrees C, preferably from 70 to 85 degrees C, evaporation times of from 1 to 15 minutes, preferably from 4 to 10 minutes, are chosen.

The basecoat A and the topcoat B are applied by conventional methods which are known in the prior art. The dry film thickness of the basecoat film is between 10 and 40 $\mu$m, preferably between 12 and 25 $\mu$m, and the dry film thickness of the topcoat film is between 20 and 60 $\mu$m, preferably between 35 and 45 $\mu$m. Following application of the topcoat B in stage (3) and prior to the baking step in stage (4), the basecoat film and the topcoat film are preferably dried at room temperature for a period of from 2 to 10 minutes, preferably from 4 to 6 minutes.

The baking of the basecoat and topcoat films in stage (4) takes place in suitable apparatus known from the prior art, preferably at temperatures between 120 and 160 degrees C, with particular preference between 130 and 150 degrees C, for a period of preferably from 10 to 40 minutes, with particular preference from 15 to 30 minutes.

The present invention additionally provides a substrate coated with a multicoat finish, said finish being applied to the substrate surface by (1): applying an aqueous basecoat A to the substrate surface, (2): allowing the basecoat A applied in stage (1) to undergo evaporation to form a polymer film therefrom, (3): subsequently, applying an aqueous transparent topcoat B to the basecoat film obtained in stage (2), and finally (4): baking the basecoat film and the topcoat film together, wherein the basecoat A comprises at least one hydroxyl-containing binder in aqueous solution or dispersion and a stable aqueous dispersion, prepared with a hydroxyl-containing emulsifier, of a hydrophobicized amino resin.

Suitable substrates for coating are primarily pretreated metal substrates; however, it is also possible to cover non-pretreated metals or any other substrates, such as wood or plastics, for example, with a multicoat protective and/or decorative coating using the basecoats of the invention.

The invention is illustrated using the following examples. All parts and percentages are by weight unless expressly noted otherwise.

EXAMPLES

Example 1

Preparation of an Aqueous Basecoat A1 of the Invention

In a reaction vessel with stirrer, internal thermometer, reflux condenser and electrical heating, 237.4 g of a linear polyester (synthesized from dimerized fatty acid (Pripol® 1013), isophthalic acid and 1,6-hexanediol) having a hydroxyl number of 80 mg KOH/g and a number-average molecular weight of 1400 are dissolved, following the addition of 20.2 g of dimethylolpropionic acid and 7.2 g of trimethylolpropane monoallyl ether, in 43.3 g of N-methylpyrrolidone and 144.4 g of methyl ethyl ketone. Subsequently, 88.1 g of isophorone diisocyanate are added at 45° C. After the exothermic reaction has subsided, the mixture is slowly heated to 80° C. It is maintained at this temperature until the NCO content is 1.8%. Then, after cooling to 50° C., 14.4 g of triethylamine and 538.5 g of deionized water are added in rapid succession. After 15 minutes, a mixture of 7.3 g of aminoethylethanolamine and 29.1 g of deionized water is added to the thoroughly dispersed resin. Subsequently, the temperature is raised to 60° C. and the methyl ethyl ketone is distilled off under reduced pressure.

The resulting dispersion has a solids content of approximately 35% and a pH of approximately 8.0.

463.2 g of the polyurethane resin dispersion prepared above are diluted with 263.7 g of deionized water. After the diluted dispersion has been heated to 85° C., a mixture of 50.1 g of styrene, 50.1 g of methyl methacrylate, 37.5 g of n-butyl acrylate and 37.5 g of hydroxyethyl methacrylate is added slowly over the course of 3.5 hours. Beginning at the same time as the addition of this mixture, a solution of 2.6 g of t-butyl perethylhexanoate in 35 g of methoxypropanol is added over the course of 4 hours. The mixture is subsequently held at 85° C. until the monomers have been fully consumed by reaction. If desired, further initiator is added. Finally, any coagulum produced is removed by filtration.

220 g of the thus-prepared dispersion of the acrylated polyurethane resin are mixed, with stirring, with the following additional paint components:

94.1 g of deionized water
160.0 g of polyacrylate dispersion Acronal® 290 from BASF
AG as further binder
1.0 g of ammonia
220.0 g of Laponite® as thickener
115.0 g of Aerosil® paste 805
40.0 g of Aerosil® paste 972
26.0 g of solution of a commercial wetting agent
90.0 g of a 3% strength solution of Viscalex® HV30 in water, as thickener
84.5 g of Irgazin® Red DPP BO (pigment)
26.5 g of Hostaperm® Pink E (pigment)
4.3 g of Bayferrox® 130 BM (pigment)
37.0 g of Novoperm® Orange (pigment)
6.2 g of titanium rutile (pigment) plus
55.4 g of an aqueous dispersion formed by mixing:
361.5 g of melamine resin Cymel® 1133
10.2 g of polyol emulsifier Pluronic® PE 9400, and
128.3 g of a buffer solution prepared by mixing 1.47 g of triethanolamine, 0.45 g of formic acid and 126.4 g of deionized water.

Example 2
Preparation of an Aqueous Basecoat A2 of the Invention

The basecoat A2 is prepared as for Example 1 except that melamine resin component Resimene® X755 is used.

Example 3
Preparation of an Aqueous Basecoat A3 of the Invention

The basecoat A3 is prepared as for Example 1 except that melamine resin component Luwipal® 8792 is used.

Example 4
Preparation of an Aqueous Basecoat AC1

The basecoat AC1 as a comparative example is prepared as for Example 1 except that melamine resin component Cymel® 1133 (40.0 g) is used without emulsifier but together with an additional 19.5 g of deionized water.

Example 5
Producing a Two-Coat Paint System Using the Basecoats A1 to A3 of the Invention and, Respectively, the Comparative Example AC1

The basecoats prepared in accordance with Examples 1 to 4 are applied using a gravity-feed spray gun to a metal bodywork panel coated with a commercial electrodeposition coating material and a commercial filler, in such a way that the basecoat film, dried for 5 minutes at 20° C. and for 10 minutes at 80° C., has a dry film thickness of about 15 µm. The basecoat film dried in this way is overcoated with an aqueous powder slurry clearcoat and baked at 130° C. for 30 minutes. The popping limits, mud-cracking limits and appearance measurements are set out in the following table:

| Test/basecoats | A1 | A2 | A3 | AC1 |
|---|---|---|---|---|
| Popping limit µm | 47 | 48 | 50 | 35 |
| Mud-cracking limit µm | 48 | 49 | 50 | 48 |
| Appearance | | | | |
| Longwave | 12 | 10 | 10 | 11 |
| Shortwave | 23 | 22 | 23 | 22 |

What is claimed is:

1. A process for applying a multicoat finish to a substrate surface, comprising the steps of:
   (1) forming an aqueous basecoat A by combining a dispersion of a hydrophobic amino resin in a hydroxyl containing emulsifier with an aqueous solution or dispersion of a hydroxyl containing binder;
   (2) applying the aqueous basecoat A to the substrate surface;
   (3) forming a polymer film from the aqueous basecoat A applied in step 2;
   (4) applying an aqueous transparent topcoat B to the basecoat film obtained in step (3); and
   (5) baking the basecoat film and topcoat film together.

2. The process as claimed in claim 1, wherein the hydroxyl-containing emulsifier is a diol polyol or combinations thereof.

3. The process as claimed in claim 2, wherein the hydroxyl-containing emulsifier includes a diol or polyol having a molecular weight of at least 500 daltons.

4. The process as claimed in claim 2, wherein the hydroxyl-containing emulsifier comprises a member selected from the group consisting of polyurethanediols polyurethanepolyols, polycarbonatediols, polycarbonatepolyols, polyacrylatediols, polyacrylatepolyols, polyesterdiols, polyesterpolyols, polyetherdiols, polyetherpolyols, and combinations thereof.

5. The process as claimed in claim 4, wherein the hydroxyl-containing emulsifier comprises a polyurethanediol, polyurethanepolyol, polycarbonatediol, polycarbonatepolyol, or combinations thereof.

6. The process as claimed in claim 1, wherein the hydrophobic amino resin is a hydrophobic melamine resin.

7. The process as claimed in claim 6, wherein the hydrophobic melamine resin is prepared by etherifying a melamine-formaldehyde condensate with C3 to C12 alcohols.

8. The process as claimed in claim 1, wherein the hydroxyl-containing binder in the basecoat A is a polymer selected from the group consisting of polyacrylates, polyurethanes, polyesters, polyethers, alkyd resins cellulose derivatives, and combinations thereof.

9. The process as claimed in claim 8, wherein the hydroxyl-containing binder in the basecoat A is an aqueous dispersion of an acrylated polyurethane resin.

10. The process as claimed in claim 1, wherein the aqueous transparent topcoat B is an aqueous one-component or two-component clearcoat.

11. The process as claimed in claim 10, wherein the aqueous transparent topcoat B is a powder slurry clearcoat.

12. A substrate coated with a multicoat finish, said finish being applied to the substrate surface by a process comprising the steps of:

forming an aqueous basecoat A by combining a dispersion of a hydrophobic amino resin in a hydroxyl containing emulsifier with an aqueous solution or dispersion of a hydroxyl containing binder;

(2) applying the aqueous basecoat A to the substrate surface;

(3) forming a polymer film from the aqueous basecoat A applied in step 2;

(4) applying an aqueous transparent topcoat B to the basecoat film obtained in step (3); and (5) baking the basecoat film and topcoat film together.

13. The substrate of claim 12, wherein the hydroxyl-containing emulsifier is a diol, polyol or combinations thereof.

14. The substrate of claim 13, wherein the hydroxyl-containing emulsifier comprises a member selected from the group consisting of polyurethanediols, polyurethanepolyols, polycarbonatediols, polycarbonatepolyols, polyacrylatediols, polyacrylatepolyols, polyesterdiols, polyesterpolyols, polyetherdiols, polyetherpolyols, and combinations thereof.

15. The substrate of claim 12, wherein the hydrophobic amino resin is a hydrophobic melamine resin.

16. The substrate of claim 12, wherein the hydroxyl-containing binder in the basecoat A is a polymer selected from the group consisting of polyacrylates, polyurethanes, polyesters, polyethers, alkyd resins, cellulose derivatives and combinations thereof.

17. The substrate of claim 12, wherein the aqueous transparent topcoat B is an aqueous one-component or two-component clearcoat.

18. The substrate of claim 17, wherein the aqueous transport topcoat B is a powder slurry clearcoat.

* * * * *